(12) United States Patent
Srinivasan et al.

(10) Patent No.: US 12,055,756 B2
(45) Date of Patent: Aug. 6, 2024

(54) PUSH-PULL NON-RECIPROCAL PHASE SHIFTING

(71) Applicant: Regents of the University of Minnesota, Minneapolis, MN (US)

(72) Inventors: Karthik Srinivasan, Minneapolis, MN (US); Bethanie Joyce Hills Stadler, Shoreview, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 17/768,328

(22) PCT Filed: Oct. 14, 2020

(86) PCT No.: PCT/US2020/055581
§ 371 (c)(1),
(2) Date: Apr. 12, 2022

(87) PCT Pub. No.: WO2021/076627
PCT Pub. Date: Apr. 22, 2021

(65) Prior Publication Data
US 2024/0061175 A1    Feb. 22, 2024

Related U.S. Application Data

(60) Provisional application No. 62/914,889, filed on Oct. 14, 2019.

(51) Int. Cl.
*G02F 1/21*     (2006.01)
*G02B 6/12*     (2006.01)
(Continued)

(52) U.S. Cl.
CPC ......... *G02B 6/132* (2013.01); *G02B 6/12004* (2013.01); *G02B 2006/12061* (2013.01); *G02F 1/0955* (2013.01); *G02F 1/212* (2021.01)

(58) Field of Classification Search
None
See application file for complete search history.

(56) References Cited

U.S. PATENT DOCUMENTS 8,168,939 B2    5/2012   Mack et al.
11,823,879 B2   11/2023  Shinada et al.
(Continued)

FOREIGN PATENT DOCUMENTS

CN    102485975    6/2012
CN    105220231    1/2016
(Continued)

OTHER PUBLICATIONS

PCT International Preliminary Report on Patentability in International Appln. No. PCT/US2020/055581, dated Apr. 19, 2022, 6 pages.
(Continued)

*Primary Examiner* — Omar R Rojas
(74) *Attorney, Agent, or Firm* — Fish & Richardson P.C.

(57) ABSTRACT

A non-reciprocal phase shift device may include an optical waveguide (e.g., a silicon waveguide) on a substrate; and a magneto-optical cladding layer on the optical waveguide, wherein the magneto-optical cladding layer includes a plurality of segments arranged having alternating magnetization directions aligned transverse to a longitudinal direction of the optical waveguide.

33 Claims, 10 Drawing Sheets

(51) Int. Cl.
  *G02B 6/132* (2006.01)
  *G02F 1/095* (2006.01)

(56) References Cited

U.S. PATENT DOCUMENTS

| | | |
|---|---|---|
| 2009/0003757 A1 | 1/2009 | Mizumoto et al. |
| 2013/0251299 A1 | 9/2013 | He et al. |
| 2017/0269395 A1 | 9/2017 | Heck et al. |
| 2019/0018265 A1 | 1/2019 | Kolis et al. |
| 2019/0101773 A1 | 4/2019 | Stadler et al. |
| 2022/0214568 A1 | 7/2022 | Srinivasan et al. |

FOREIGN PATENT DOCUMENTS

| | | |
|---|---|---|
| CN | 105549154 | 5/2016 |
| CN | 107870456 | 4/2018 |
| CN | 108107507 | 6/2018 |
| CN | 108483902 | 9/2018 |
| EP | 2492379 | 8/2012 |
| EP | 2746839 | 6/2014 |
| KR | 20180079009 | 7/2018 |
| WO | WO 2017019746 | 2/2017 |
| WO | WO 2017160420 | 9/2017 |
| WO | WO 2020219554 | 10/2020 |

OTHER PUBLICATIONS

Hughes, Semicore.com [online], "What is DC Sputtering?" Nov. 26, 2016, retrieved on Apr. 24, 2024, retrieved from URL<https://web.archive.org/web/20231104020601/https://www.semicore.com/news/94-what-is-dc-sputtering>, 3 pages.

Hughes, Semicore.com [online], "What is RF Sputtering?" Oct. 27, 2016, retrieved on Apr. 24, 2024, retrieved from URL<https://web.archive.org/web/20240405233728/https://www.semicore.com/news/92-what-is-rf-sputtering>, 7 pages.

Ando et al., "Waveguide Magneto-optic Isolator Fabricated by Laser Annealing," Appl. Phys. Letters, Jul. 4, 1988, 53(1):4-6.

Bi et al., "On-Chip Optical Isolation in Monolithically Integrated Non-Reciprocal Optical Resonators," Nat. Photonics, Nov. 13, 2011, 5(12):758-762.

Bie et al., "A MoTe2-Based Light-Emitting Diode and Photodetector for Silicon Photonic Integrated Circuits," Nat. Nanotechnology, Dec. 2017, 12(12):1124-1129.

Block et al., "Growth Parameters of Fully Crystallized YIG, Bi:YIG, and Ce:YIG Films With High Faraday Rotations," IEEE Photonics Journal, Feb. 2014, 6(1):0600308, 9 pages.

Bogaerts et al., "Basic Structures for Photonic Integrated Circuits in Silicon-on-Insulator," Opt. Express, Apr. 19, 2004, 12(8):1583-1591.

Chang et al., "Thin Film Wavelength Converters for Photonic Integrated Circuits," Optica, May 2016, 3(5):531-535.

Crossley et al., "Faraday Rotation in Rare-Earth Iron Garnets," Phys. Review, May 1969, 181(2):896-904.

Dai et al., "Passive Technologies for Future Large-Scale Photonic Integrated Circuits on Silicon: Polarization Handling, Light Non-Reciprocity and Loss Reduction," Light Sci. Applications, Mar. 29, 2012, 1:e1, 12 pages.

Dai et al., "Silicon Mode (de)Multiplexer Enabling High Capacity Photonic Networks-on-Chip with a Single-Wavelength-Carrier Light," Opt. Letters, May 1, 2013, 38(9):1422-1424.

Dillon Jr., "Origin and Uses of the Faraday Rotation in Magnetic Crystals," J. Appl. Physics, 1968, 39(2):922-929.

Doerr et al., "Silicon photonics broadband modulation-based isolator," Opt. Express, Feb. 20, 2014, 22(4):4493-4498.

Dong et al., "Monolithic Silicon Photonic Integrated Circuits for Compact 100 +GB/s Coherent Optical Receivers and Transmitters," IEEE J. Sel. Top. Quantum Electronics, Jul./Aug. 2014, 20(4):6100108, 8 pages.

Dötsch et al., "Applications of Magneto-Optical Waveguides in Integrated Optics: Review," J. Opt. Soc. Am. B, Jan. 2005, 22(1):240-253.

Dulal et al., "Optimized Magneto-Optical Isolator Designs Inspired by Seedlayer-Free Terbium Iron Garnets with Opposite Chirality," ACS Photonics, Sep. 7, 2016, 3(10):1818-1825.

Dulal et al., "Sputter-Deposited Seedlayer-Free Cerium-Doped Terbium Iron Garnets for SOI Waveguide Isolators," Presented at Proceedings of 2016 IEEE Photonics Conference (IPC), Waikoloa, HI, USA, Oct. 2-6, 2016; 2016 IEE Photonics Conference (IPC), Oct. 2016, WP49:773-774.

EdmundOptics.com [online], "Free-Space Optical Isolators," available on or before Dec. 30, 2018 via Internet Archive: Wayback Machine URL<https://web.archive.org/web/20181230124440/https://www.edmundoptics.com/f/free-space-optical-isolators/33067/>, retrieved on Mar. 29, 2022, retrieved from URL<https://www.edmundoptics.com/f/free-space-optical-isolators/33067/>, 1 page.

EOTech.com [online], "Free Space Optical Isolators," available on or before Oct. 27, 2014 via Internet Archive: Wayback Machine URL<https://web.archive.org/web/20141027030439/https://www.eotech.com/cart/category2/free-space-optical-isolators>, retrieved on Mar. 29, 2022, retrieved from URL<https://web.archive.org/web/20141027030439/https://www.eotech.com/cart/category2/free-space-optical-isolators>, 3 pages.

Fratello et al., "Chapter 3—Epitaxial Garnet Films for Nonreciprocal Magneto-Optic Devices," Handbook of Thin Film Devices, 2000, 4:93-141.

Fratello et al., "Innovative Improvements in Bismuth-Doped Rare-Earth Iron Garnet Faraday Rotators," IEEE Trans. Magnetics, Sep. 1996, 32(5):4102-4107.

Gage et al., "Si-Integrated Ultrathin Films of Phase-Pure Y3Fe5O12 (YIG) via Novel Two-Step Rapid Thermal Anneal," Mater. Res. Letters, Mar. 1, 2017, 5(6):379-385.

Ghosh et al., "Compact Mach-Zehnder Interferometer Ce:YIG/SOI Optical Isolators," IEEE Photonics Technol. Letters, Sep. 15, 2012, 24(18):1653-1656.

Ghosh et al., "Optical Isolator for TE Polarized Light Realized by Adhesive Bonding of Ce:YIG on Silicon-on-Insulator Waveguide Circuits," IEEE Photonics Journal, Jun. 2013, 5(3):6601108, 9 pages.

Gomi et al., "Strong Magneto optical Enhancement in Highly Ce substituted Iron Garnet Films Prepared by Sputtering," J. Appl. Physics, Dec. 1, 1991, 70(11):7065-7067.

Goto et al., "Magneto-optical properties of cerium substituted yttrium iron garnet films with reduced thermal budget for monolithic photonic integrated circuits," Opt. Express, Dec. 17, 2012, 20(27):28507-28517.

Goto et al., "Vacuum annealed cerium-substituted yttrium iron garnet films on non-garnet substrates for integrated optical circuits," J. Appl. Physics, Apr. 10, 2013, 113(17):17A939, 3 pages.

Guillot et al., "Faraday Rotation of Bismuth Substituted Terbium Iron Garnets," IEEE Trans. Magnetics, Nov. 1994, 30(6):4419-4421.

Hua et al., "Demonstration of a Chip-Based Optical Isolator with Parametric Amplification," Nat. Communications, Nov. 25, 2016, 7:13657, 6 pages.

Huang et al., "Electrically Driven and Thermally Tunable Integrated Optical Isolators for Silicon Photonics," IEEE J. Sel. Top. Quantum Electronics, Nov./Dec. 2016, 22(6):4403408, 8 pages.

Huang et al., "Integrated broadband Ce:YIG/Si Mach-Zehnder optical isolators with over 100 nm tuning range," Opt. Letters, Dec. 1, 2017, 42(23):4901-4904.

Huang et al., "Towards Heterogeneous Integration of Optical Isolators and Circulators with Lasers on Silicon [Invited]," Opt. Mater. Express, Sep. 1, 2018, 8(9):2471-2483.

Hutchings et al., "Faraday Polarisation Mode Conversion in Semiconductor Waveguides Incorporating Periodic Garnet Claddings," Presented at Proceedings of SPIE OPTO, San Francisco, CA, USA, Feb. 13-18, 2016; Integrated Optics: Devices, Materials, and Technologies XX, Mar. 2016, 9750:97500V, 7 pages.

(56) References Cited

OTHER PUBLICATIONS

Hutchings et al., "Quasi-Phase-Matched Faraday Rotation in Semiconductor Waveguides with a Magnetooptic Cladding for Monolithically Integrated Optical Isolators," IEEE Photonics Journal, Dec. 2013, 5(6):6602512, 13 pages.

Ishida et al., "Amorphous-Si waveguide on a garnet magneto-optical isolator with a TE mode nonreciprocal phase shift," Opt. Express, Jan. 6, 2017, 25(1):452-462.

Jalas et al., "What is—and what is not—an optical isolator," Nat. Photonics, Jul. 30, 2013, 7(8):579-582.

Karki et al., "Thin-Film Magnetless Faraday Rotators for Compact Heterogeneous Integrated Optical Isolators," J. Appl. Physics, Jun. 15, 2017, 121(23):233101, 7 pages.

Keyvaninia et al., "Demonstration of a Heterogeneously Integrated III-V/SOI Single Wavelength Tunable Laser," Opt. Express, Feb. 11, 2013, 21(3):3784-3792.

Kim et al., "Low-Voltage High-Performance Silicon Photonic Devices and Photonic Integrated Circuits Operating up to 30 Gb/S," Opt. Express, Dec. 19, 2011, 19(27):26936-26947.

Komljenovic et al., "Heterogeneous Silicon Photonic Integrated Circuits," J. Light. Technology, Jan. 2016, 34(1):20-35.

Kučera, "Magneto-optics of Ce3+ doped garnets," J. Magn. Magn. Materials, Oct. 1991, 101(1-3):242-244.

Lacklison et al., "The Faraday Rotation of Bismuth Calcium Vanadium Iron Garnet," Solid State Communications, Feb. 1972, 10(3):269-272.

Lamponi et al., "Low-Threshold Heterogeneously Integrated InP/SOI Lasers with a Double Adiabatic Taper Coupler," IEEE Photonics Technol. Letters, Jan. 2012, 24(1):76-78.

LightwaveOnline.com [online], "Isolators protect fiber-optic systems and optical amplifiers," Oct. 1, 1999, retrieved on Mar. 29, 2022, retrieved from URL<https://www.lightwaveonline.com/optical-tech/transport/article/16648509/isolators-protect-fiberoptic-systems-and-optical-amplifiers>, 21 pages.

Lin et al., "Compact Dynamic Optical Isolator Based on Tandem Phase Modulators," Opt. Letters, May 1, 2019, 44(9):2240-2243.

Nagarajan et al., "Large-Scale Photonic Integrated Circuits," IEEE J. Sel. Top. Quantum Electronic, Jan./Feb. 2005, 11(1):50-65.

Newport.com [online], "Faraday Optical Isolators," available on or before Jul. 15, 2016, via Internet Archive: Wayback Machine URL<https://web.archive.org/web/20160715173521/https://www.newport.com/c/faraday-optical-isolators>, retrieved on Mar. 29, 2022, retrieved from URL<https://www.newport.com/c/faraday-optical-isolators>, 1 page.

Onbasli et al., "Integration of bulk-quality thin film magneto-optical cerium-doped yttrium iron garnet on silicon nitride photonic substrates," Opt. Express, Oct. 7, 2014, 22(21):25183-25192.

PCT International Search Report and Written Opinion in International Appln. No. PCT/US2020/055581, dated Jan. 28, 2021, 8 pages.

Phillips et al., "Apodization of Chirped Quasi-Phasematching Devices," J. Opt. Soc. Am. B, Jun. 2013, 30(6):1551-1568.

Piggott et al., "Inverse Design and Demonstration of a Compact and Broadband On-Chip Wavelength Demultiplexer," Nat. Photonics, May 11, 2015, 9(6):374-377.

Pintus et al., "Microring-Based Optical Isolator and Circulator with Integrated Electromagnet for Silicon Photonics," J. Light. Technology, Apr. 15, 2017, 35(8):1429-1437.

Polytec.com [online], "Optical Isolators and Faraday-Isolators," available on or before Sep. 26, 2020, via Internet Archive: Wayback Machine URL<https://web.archive.org/web/20200926052311/https://www.polytec.com/eu/optical-systems/products/laser-and-laser-accessories/faraday-isolators/>, retrieved on Mar. 29, 2022, retrieved from URL<https://www.polytec.com/eu/optical-systems/products/laser-accessories/electro-optic-components/faraday-isolators>, 5 pages.

Shirasaki et al., "Compact Optical Isolator for Fibers Using Birefringent Wedges," Appl. Optics, Dec. 1, 1982, 21(23):4296-4299.

Shoji et al., "Magneto-optical isolator with silicon waveguides fabricated by direct bonding," Appl. Phys. Letters, Feb. 21, 2008, 92(7):071117, 4 pages.

Shoji et al., "MZI Optical Isolator with Si-Wire Waveguides by Surface-Activated Direct Bonding," Opt. Express, Jul. 30, 2012, 20(16):18440-18448.

Shoji et al., "Optical Nonreciprocal Devices Based on Magneto-Optical Phase Shift in Silicon Photonics," J. Optics, Nov. 20, 2015, 18(1):013001, 15 pages.

Shoji et al., "Waveguide Magneto-Optical Devices for Photonics Integrated Circuits [Invited]," Opt. Mater. Express, Aug. 1, 2018, 8(8):2387-2394.

Shoji et al., "Wideband Design of Nonreciprocal Phase Shift Magneto-Optical Isolators Using Phase Adjustment in Mach-Zehnder Interferometers," Appl. Optics, Sep. 20, 2006, 45(27):7144-7150.

Soref, "The Past, Present, and Future of Silicon Photonics," IEEE J. Sel. Top. Quantum Electronics, Nov./Dec. 2006, 12(6):1678-1687.

Srinivasan et al., "High-Gyrotropy Seedlayer-Free Ce:TbIG for Monolithic Laser-Matched SOI Optical Isolators," ACS Photonics, Sep. 6, 2019, 6(10):2455-2461.

Srinivasan et al., "Integrated Silicon-on-Insulator Isolators using Seedlayer-Free Garnet," Presented at Proceedings of MINT Research Review 2018, Minneapolis, MN, USA, Oct. 11, 2018, 15 pages.

Srinivasan et al., "Interfacial and Bulk Magnetic Properties of Stoichiometric Cerium Doped Terbium Iron Garnet Polycrystalline Thin Films," Adv. Funct. Materials, Apr. 14, 2020, 30(15):2000409.

Srinivasan et al., "Magnetic and Magneto-Optical Properties of Seedlayer-Free Cerium-Doped Terbium Iron Garnets," Presented at Proceedings of the 2019 Joint MMM-Intermag Conference, Washington, DC, USA, Jan. 14-18, 2019, 15 pages.

Srinivasan et al., "Magneto-Optical Materials and Designs for Integrated TE- and TM-Mode Planar Waveguide Isolators: A Review [Invited]," Opt. Mater. Express, Nov. 1, 2018, 8(11):3307-3318.

Srinivasan et al., "Novel Rare-Earth Iron Garnets on Non-Garnet Substrates: Fabrication to Application," Poster, Presented at Proceedings of the IEEE Magnetics Summer School 2018, Quito, Ecuador, Jun. 7, 2018, 1 page.

Srinivasan et al., "Seed-Layer Free Cerium-Doped Terbium Iron Garnet on Non-Garnet Substrates for Photonic Isolators", Presented at Proceedings of Conference on Lasers and Electro-Optics 2018, San Jose, Ca, USA, May 13-18, 2018, 19 pages.

Srinivasan et al., "Seed-Layer Free Cerium-Doped Terbium Iron Garnet on Non-Garnet Substrates for Photonic Isolators," OSA Technical Digest, 2018, SW4I.5, 2 pages.

Stadler et al., "Integrated magneto-optical materials and isolators: a review," IEEE Photonics Journal, Feb. 2014, 6(1):0600215, 16 pages.

Stadler et al., "Sputter-Deposited Magneto-Optical Garnet for All-Mode (Transverse Electric/Transverse Magnetic) Faraday Rotators," MRS Bulletin, Jun. 11, 2018, 43(6):430-435.

Stadler et al., "Sputter-deposited yttria-alumina thin films for optical waveguiding," J. Appl. Physics, Jul. 1, 1998, 84(1):93-99.

Stevens et al., "Promising Materials for High Power Laser Isolators," Laser Tech. Journal, May 2016, 13(3):18-21.

Sun et al., "Single-Step Deposition of Cerium-Substituted Yttrium Iron Garnet for Monolithic On-Chip Optical Isolation," ACS Photonics, Jun. 10, 2015, 2(7):856-863.

Sung et al., "Magneto-Optical Garnet Waveguides on Semiconductor Platforms: Magnetics, Mechanics, and Photonics," J. Appl. Physics, Mar. 31, 2011, 109(7):07B738, 4 pages.

Takei et al., "Design and Simulation of Silicon Waveguide Optical Circulator Employing Nonreciprocal Phase Shift," Jpn. J. Appl. Physics, May 20, 2010, 49(5R):052203, 7 pages.

Thomson et al., "Roadmap on Silicon Photonics," J. Optics, Jun. 24, 2016, 18(7):073003, 21 pages.

Thorlabs.com [online], "IR Fiber Optic Isolators with PM Fiber (1290-2010 nm)," available on or before Feb. 4, 2013, via Internet Archive: Wayback Machine URL<https://web.archive.org/web/20130204145904/https://www.thorlabs.com/newgrouppage9.cfm?objectgroup_id=6763>, retrieved on Mar. 29, 2022, retrieved from URL<https://www.thorlabs.com/newgrouppage9.cfm?objectgroup_id=6763>, 4 pages.

(56) References Cited

OTHER PUBLICATIONS

Welch et al., "The Realization of Large-Scale Photonic Integrated Circuits and the Associated Impact on Fiber-Optic Communication Systems," J. Light. Technology, Dec. 2006, 24(12):4674-4683.

Xia et al., "Ultracompact Optical Buffers on a Silicon Chip," Nat. Photonics, Dec. 21, 2006, 1(1):65-71.

Xu et al., "Silicon Photonic Integration Platform-Have We Found the Sweet Spot?," IEEE J. Sel. Top. Quantum Electronics, Jul./Aug. 2014, 20(4):8100217, 17 pages.

Yazaki et al., "Demonstration of Interferometric Waveguide Optical Isolator with a Unidirectional Magnetic Field," Jpn. J. Appl. Physics, 2007, 46(8S):5460-5464.

Yokoi et al., "Demonstration of an Optical Isolator by Use of a Nonreciprocal Phase Shift," Appl. Optics, 1999, 38(36):7409-7413.

Yoshida et al., "Optical Properties and Faraday Effect of Ceramic Terbium Gallium Garnet for a Room Temperature Faraday Rotator," Opt. Express, Aug. 1, 2011, 19(16):15181-15187.

Zhang et al., "Monolithic Integration of Broadband Optical Isolators for Polarization-Diverse Silicon Photonics," Optica, Apr. 2019, 6(4):473-478.

Zhang et al., "Monolithically-Integrated TE-Mode 1D Silicon-on-Insulator Isolators Using Seedlayer-Free Garnet," Sci. Reports, Jul. 19, 2017, 7:5820, 8 pages.

Zheleznov et al., "Improving characteristics of Faraday isolators based on TAG ceramics by cerium doping," Opt. Letters, Apr. 1, 2014, 39(7):2183-2186.

U.S. Appl. No. 17/605,202, filed Oct. 20, 2021, Karthik Srinivasan, Pending.

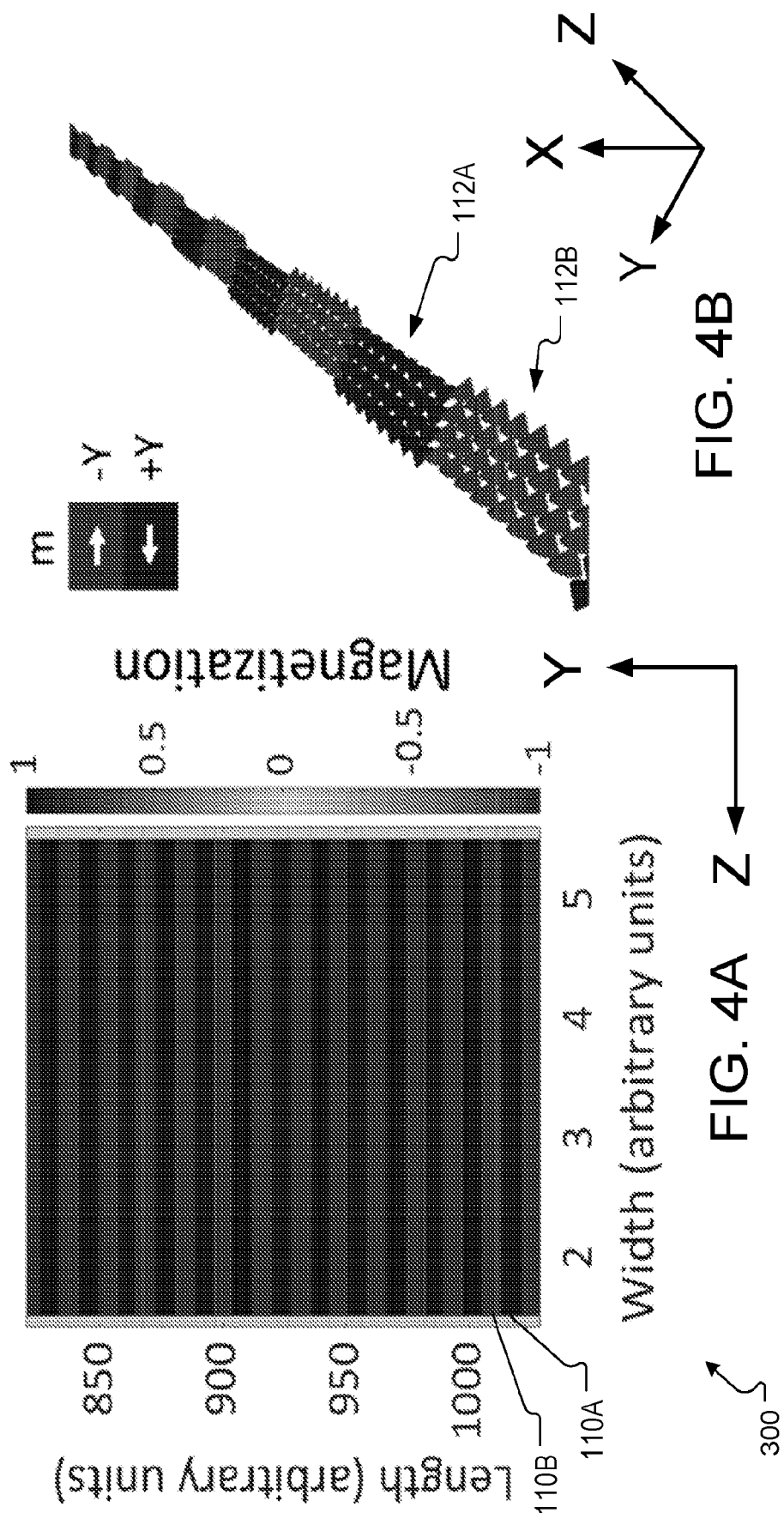

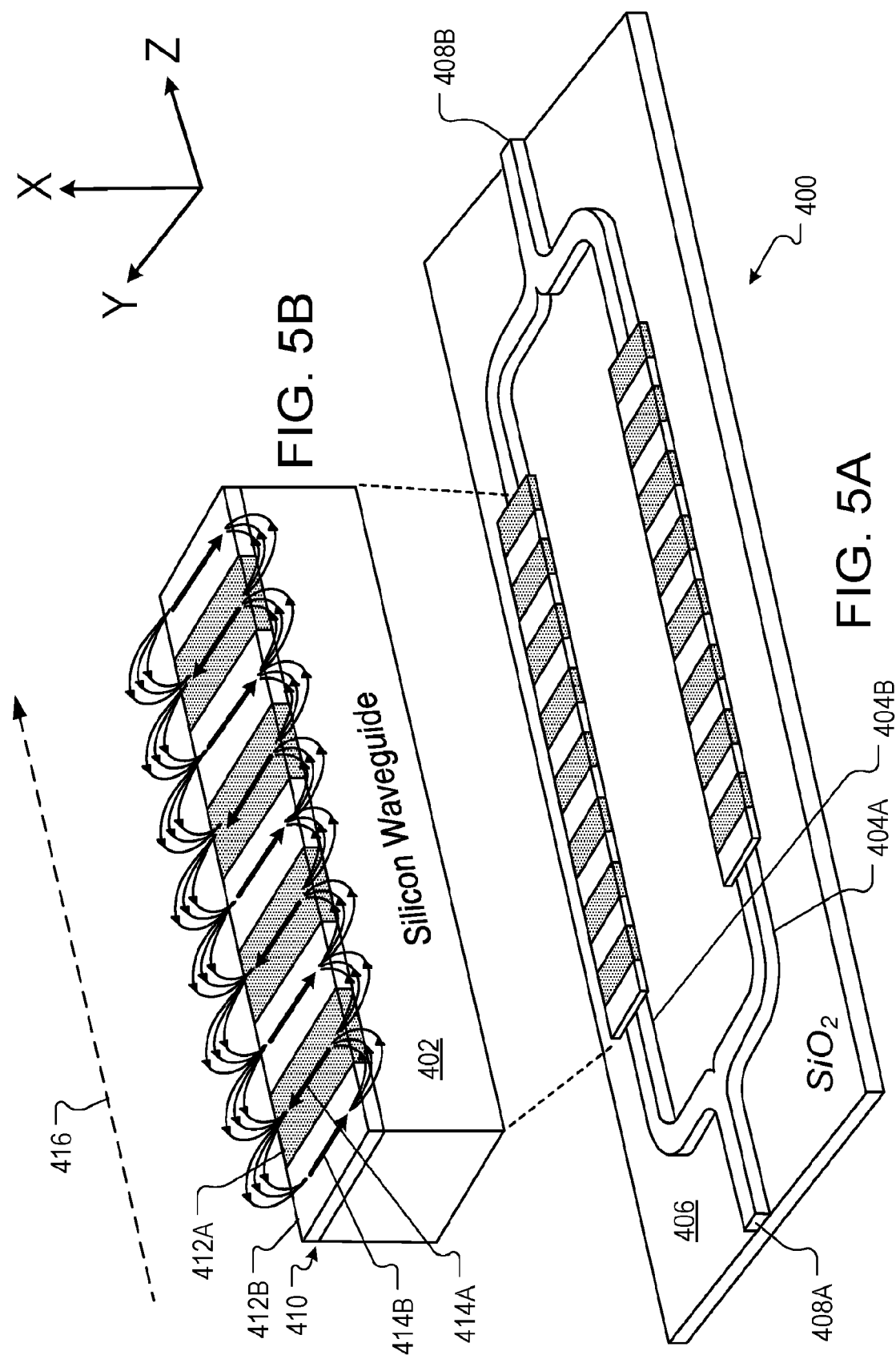

PUSH-PULL NON-RECIPROCAL PHASE SHIFTING

CROSS-REFERENCE TO RELATED APPLICATIONS

This application is a National Stage application under 35 U.S.C. § 371 of International Application No. PCT/US2020/055581, having an International Filing Date of Oct. 14, 2020, which claims the benefit of U.S. Application No. 62/914,889, filed Oct. 14, 2019. The disclosure of the foregoing application is hereby incorporated by reference in its entirety.

STATEMENT AS TO FEDERALLY SPONSORED RESEARCH

This invention was made with government support under ECCS-1708887 and ECCS-1542202 via the National Nanotechnology Coordinated Infrastructure Network both awarded by the National Science Foundation. The Government has certain rights in the invention.

TECHNICAL FIELD

This disclosure generally relates to push-pull non-reciprocal phase shifting.

BACKGROUND

Photonic computing platforms use photons produced by lasers or diodes for computation. These platforms offer the ability to process large volumes of data with high data rates and low power consumption. For example, the ability to deliver high data rates over large volumes of data across the Internet depends on the capacity of data channels. Despite recent advancements in high-speed low-power optical fiber technologies and dense wavelength division multiplexing schemes, a majority of short distance data exchange still occurs via electrical pathways.

SUMMARY

This disclosure relates generally to push-pull non-reciprocal phase shifting including devices that employ push-pull non-reciprocal phase shifting, such as, e.g., optical isolators, and methods of fabricating the same.

An end-to-end optical connectivity is impeded by a lack of chip-scale photonics, where lasers and isolators can be housed along with other on-chip optical components. Currently, hybrid modules of lasers include isolators that are integrated as a package containing a bulk magneto-optic garnet with a ball lens and a permanent magnet for biasing the garnet. The existing design poses a scalability bottleneck. As a result, current silicon photonic architectures lack deployable solutions for integrating isolators to protect the lasers.

Rare-earth iron garnets ($R_3Fe_5O_{12}$, R: Y, Tb etc.) are a unique class of materials that exhibit magneto-optic properties, which manifest as either Faraday rotation or a phase shift in the presence of either a longitudinal or a transverse magnetization, respectively. The dielectric tensors for these garnets have non-zero off-diagonal elements that introduce time reversal asymmetry, that is, any change to light in the forward direction is not the same as in reverse direction.

In certain examples, the non-reciprocal phase shift (NRPS) devices described herein use the aforementioned magneto-optic properties to cause a phase shift that can be used in either a ring resonator or an interferometer to allow the transmission of forward traveling light, but not allow the transmission of backward traveling reflected light. When the NRPS device is configured to block the reflected light, it is called an optical isolator, because it isolates the light source (usually a laser) from receiving back propagating light which can damage the laser. As a result, an optical isolator can mitigate effects of back reflections such as spurious amplification, intensity instability and frequency jumps in a laser source.

In general, in some aspects, the subject matter of the present disclosure is embodied in NRPS devices that include: an optical waveguide on a substrate; and a magneto-optical cladding layer on the optical waveguide, in which the magneto-optical cladding layer includes multiple segments arranged having alternating magnetization directions aligned transverse to a longitudinal direction of the optical waveguide.

In general, in some other aspects, the subject matter of the present disclosure is embodied in NRPS devices that include: an optical waveguide on a substrate; and a cladding including alternating segments of positive and negative Faraday rotating garnets on the optical waveguide. In general, in some other aspects, the subject matter of the present disclosure is embodied in optical isolators that include: an optical waveguide including multiple optical paths arranged as an interferometer on a substrate; and a magneto-optical cladding layer on each path of the multiple optical paths of the optical waveguide, in which the magneto-optical cladding layer includes multiple segments arranged having alternating magnetization directions aligned transverse to a longitudinal direction of the optical waveguide.

Implementations of the NRPS devices can include one or more of the following features. For example, in some implementations, the multiple segments are arranged in an alternating sequence. In some cases, the multiple segments alternate in the longitudinal direction of the optical waveguide.

In some implementations, the multiple segments include a first segment having positive (negative) gyrotropy and a second segment having negative (positive) gyrotropy. In some cases, the negative gyrotropy is less than 3200 degrees per centimeter. In some cases, the positive gyrotropy is less than 500 degrees per centimeter. In some cases, the positive gyrotropy and the negative gyrotropy are equal. In some cases, the positive gyrotropy and the negative gyrotropy are equal and the positive gyrotropy and negative gyrotropy are greater than or equal to 3200 degrees per centimeter.

In some implementations, the multiple segments are configured to provide a phase shift to an electromagnetic wave within the optical waveguide. In some cases, the phase shift is accumulated as the electromagnetic wave travels through the magnetization.

In some implementations, the alternating magnetization directions are opposite relative to each other.

In some implementations, an external magnetic field is not required to sustain the magnetization.

In some implementations, the multiple segments are magnetostatically stable without an externally applied magnetic field.

In some implementations, the non-reciprocal phase shift device is monolithically integrated.

In some implementations, the multiple segments include one or more of Ce:YIG, Bi:TIG, Bi:TbIG, Ce:TbIG, YIG, and TbIG garnets. In some cases, the garnets have a saturation magnetization below 200 emu/cc.

In some implementations, the multiple segments include garnets having coercivity greater than 1 kOe and garnets having coercivity less than 200 Oe.

In some implementations, the multiple segments include seedlayer-free garnets.

In some implementations, the multiple segments are longer along a direction transverse to the longitudinal direction of the optical waveguide than along the longitudinal direction. In some cases, the multiple segments have a width of 500 nanometer along the direction transverse to the longitudinal direction of the waveguide and a length of 1 micrometer along the direction transverse to the longitudinal direction of the optical waveguide.

In some implementations, a length of the magneto-optical cladding layer measured along the longitudinal direction of the optical waveguide is less than 500 micrometers.

In some implementations, the NRPS device and/or optical isolator includes the substrate.

In some implementations, the alternating segments of the cladding are segmented such that dipole interactions stabilize magnetization while adding a phase shift.

In some implementations, wherein a net accumulation of Faraday rotation is achieved every positive and negative segmented cycle.

In some implementations, the negative Faraday rotating garnet is one or more of Ce:YIG, Bi:TIG, Bi:TbIG, and Ce:TbIG.

In some implementations, the positive and negative Faraday rotating garnets are seedlayer free.

In some implementations, the positive Faraday rotating garnets have a Faraday rotation of less than 500 degrees per centimeter.

In general, in some other aspects, the subject matter of the present disclosure are embodied in methods of manufacturing non-reciprocal phase shift devices that include: providing an optical waveguide on a substrate; and forming a magneto-optical cladding layer on the optical waveguide, in which the magneto-optical cladding layer includes multiple segments arranged having alternating magnetization directions aligned transverse to a longitudinal direction of the optical waveguide.

Implementations of the methods can include one or more of the following features. For example, in some implementations, forming the magneto-optical cladding layer includes: patterning a first material of the multiple segments on the optical waveguide; and patterning a second material of the multiple segments on the optical waveguide.

In some implementations, the first material has either a positive or negative gyrotropy and the second material has the other of the positive or negative gyrotropy.

In some implementations, the first material has either a positive or a negative gyrotropy.

In some implementations, the first material and the second material include one or more of: Ce:YIG, Bi:TIG, Bi:TbIG, and Ce:TbIG garnets.

Implementations of the NRPS devices, optical isolators, and the manufacturing method can include one or more of the following advantages. For example, in some implementations, NRPS devices are small-footprint "push-pull" devices and have segments on a cladding layer alternatively arranged (hence "push-pull") such that dipole interactions stabilize the magnetization while accumulating a phase shift to an electromagnetic wave along a waveguide using garnets that alternate along the waveguide.

In some implementations, the NRPS device is implemented as an optical isolator in the form of a Mach-Zehnder interferometer. Such interferometer designs can be used in photonic quantum computing and massively parallel computing systems and can be extremely small. For example, an end-to-end length of an NRPS optical isolator interferometer can be less than 350 micrometers. In some implementations, the NRPS device is implemented as a ring resonator design.

In some implementations, the NRPS devices are magnet-free because an external magnet is not required to cause the phase shift. This is achievable with a unique garnet material on the cladding layer and a polarization process to magnetize the garnet along a direction traverse to the direction of wave propagation. Previous attempts at such designs were impractical due to the large stray field emerging from magnet free structures.

In some implementations, the optical isolators can be monolithically integrated using standard CMOS foundry processes, such that they are usable in photonic integrated circuits. These aspects will be described with reference to FIGS. 6A-6I below. In this way, the optical isolators are fully-integrated magnet-free waveguide isolators.

In some implementations, monolithic NRPS optical isolators do not require a seedlayer. Incorporating seedlayers can be difficult to fabricate because of multiple annealing and alignment steps required to form them. Seedlayers also increase the size of the cladding layer. As a result, the monolithic NRPS devices described in this application utilize cerium doped terbium iron garnet (Ce:TbIG), that has a large gyrotropy ($>=-3200$ degrees/cm) to cause the phase shift as described above, and that can be deposited without a seedlayer on a silicon substrate. This is part of a sputter deposition process to accurately produce high gyrotropy with high repeatability. The magnetic hysteresis of Ce:TbIG shows a 70% remnant magnetization and latched isolators have been shown that can operate in the absence of a magnetization. This sputter deposition process is described in more detail in PCT Application PCT/US2020/029333 filed Apr. 22, 2020 and incorporated herein by reference in its entirety.

In some implementations, a high (e.g., >500 deg/cm) gyrotropy seedlayer-free garnet is used for the segments of the cladding layer. This decreases the end-to-end length of the NRPS device. This is achieved by enhancing the positive FR in garnets (YIG, TbIG), which is typically otherwise limited to <500 deg/cm.

The details of one or more implementations of the subject matter of this disclosure are set forth in the accompanying drawings and the description below. Other features, aspects, and advantages of the subject matter will become apparent from the description, the drawings, and the claims.

BRIEF DESCRIPTION OF THE DRAWINGS

FIG. 4A is a plot illustrating a simulation of magnetization for an exemplary NRPS device.

FIG. 4B is a schematic illustrating a simulation of a stable magnetization for an exemplary NRPS device.

FIG. 5A is a perspective view of an example of an optical isolator that includes a NRPS shift device.

FIG. 5B is a perspective view of an exemplary NRPS device of the optical isolator of FIG. 5A.

DETAILED DESCRIPTION

Figure 1A:
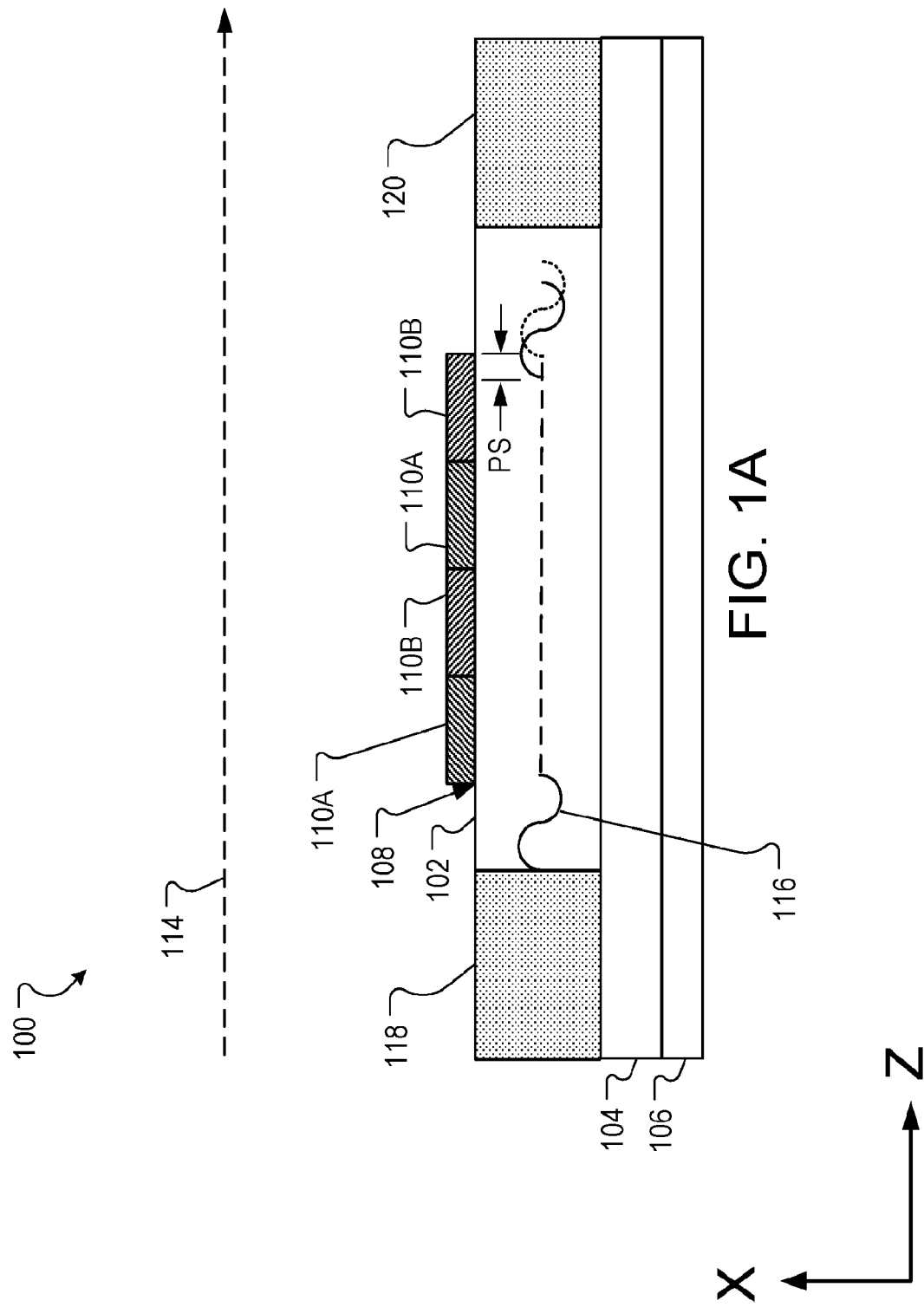
FIGS. 1A and 1B are side and top views of an example of a non-reciprocal phase shift (NRPS) device, respectively.
Figure 1B:
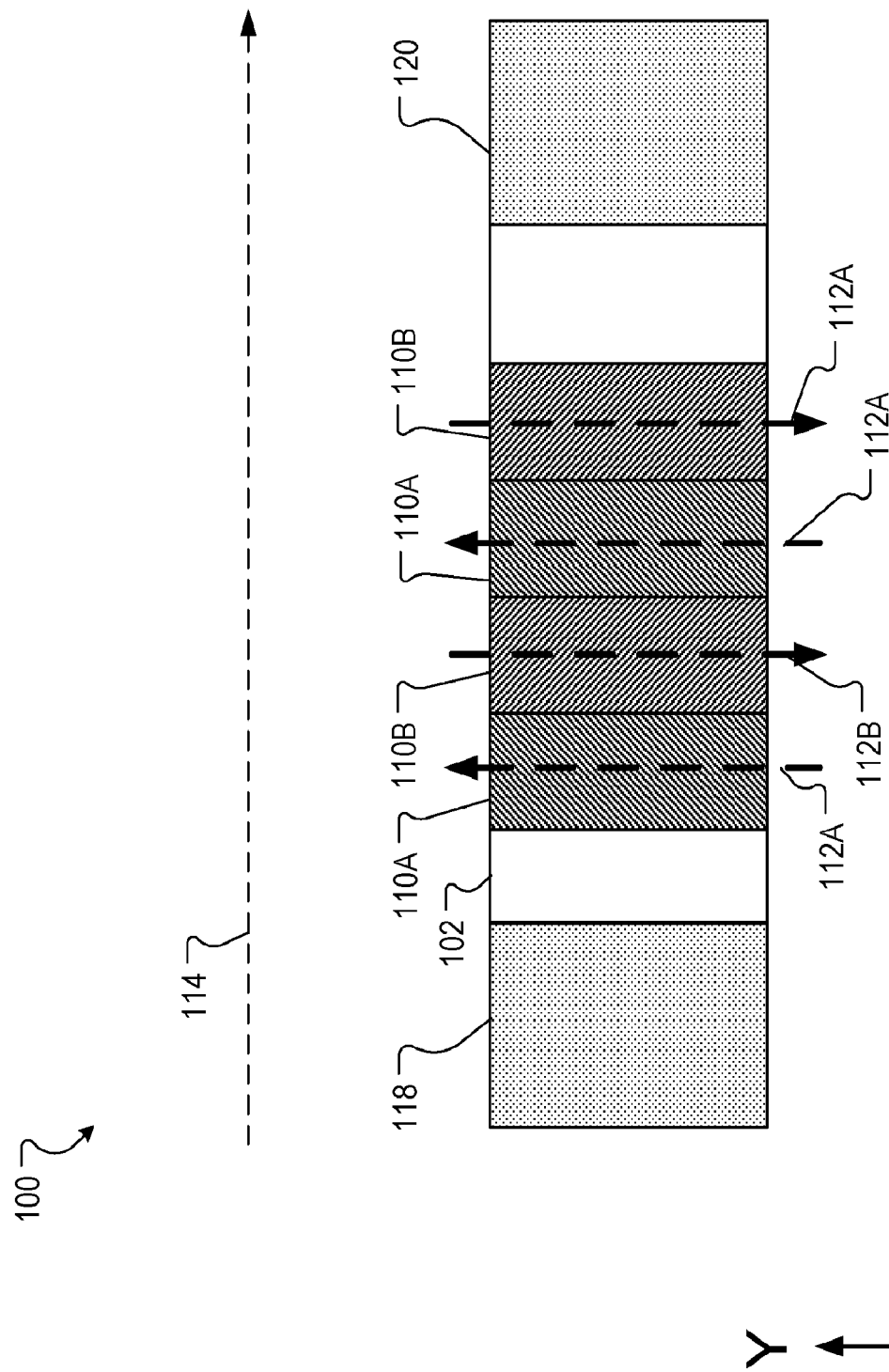
Figure 2:
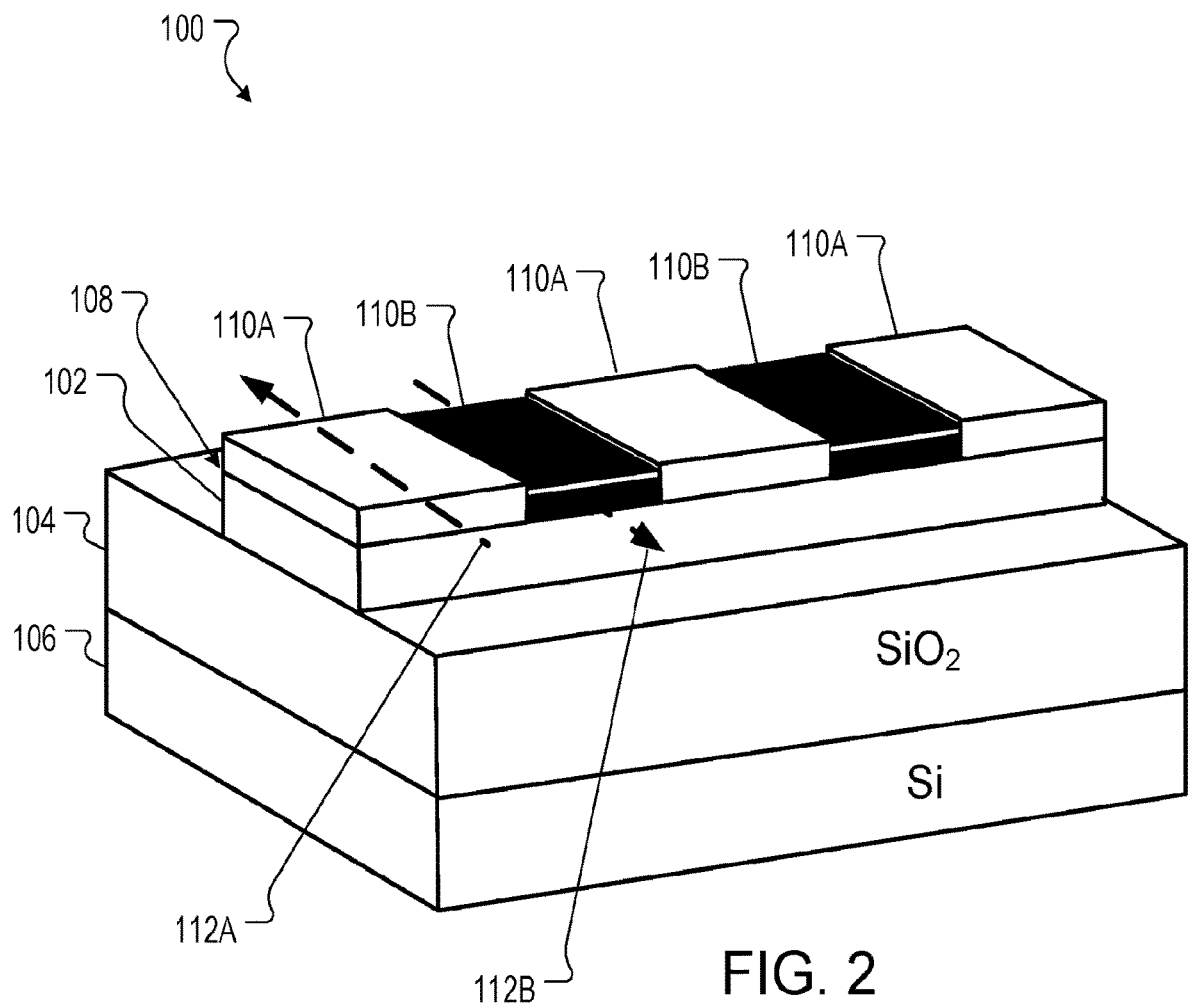
FIG. 2 is a perspective view of the NRPS device of FIGS. 1A and 1B.

FIGS. 1A and 1B show an example non-reciprocal phase shift (NRPS) device 100 and FIG. 2 shows a perspective view of the non-reciprocal phase shift device 100. The NRPS device 100 includes an optical waveguide 102 (e.g., a silicon waveguide) on a substrate 104 (e.g., Si-on-insulator wafer, that is Si on SiO2 substrate). In some implementations, the substrate 104 includes a first layer 104 (e.g., of $SiO_2$) and a second layer 106 (e.g., Si) as shown in FIGS. 1A and 2.

The NRPS device 100 includes a magneto-optical cladding layer 108 on the optical waveguide 102. The magneto-optical cladding layer 108 includes a plurality of segments 110A, 110B (collectively 110). The segments 110A, 1101B include a first segment 110A with a positive gyrotropy property and a second segment 110B with a negative gyrotropy property. The gyrotropy properties cause a Faraday rotation of an electromagnetic wave propagating through a magnetization of the segments 110A, 10B. The Faraday rotation of the electromagnetic wave leads to a phase shift of the electromagnetic wave when the magnetization is aligned transverse to a longitudinal direction 114 of the optical waveguide 102 (i.e., along direction Y). The longitudinal direction 114 of the optical waveguide 102 is the general wave propagation direction of the light (i.e., along direction Z). Aligning the magnetization directions transverse to the longitudinal direction 114 of the optical waveguide 10 is a characteristic of NPRS devices, while aligning the magnetization directions in line with the longitudinal direction 114 of the optical waveguide 102 is a characteristic of non-reciprocal mode conversion (NRMC) devices.

Faraday rotation is represented by an amount of rotation (e.g., in degrees) of an electromagnetic wave per length (e.g., centimeters) of the gyrotropy material. For example, the positive gyrotropy material used in the first segment 110A can represent a Faraday rotation of 3700 deg/cm and the negative gyrotropy material used in the second segment 110B can represent a Faraday rotation of −3700 deg/cm.

For example, a 243.2 micrometer long segment with a positive gyrotropy material to cause a Faraday rotation of 3700 deg/cm would generate a 90 degree phase shift of an electromagnetic wave passing through the magnetization of the 243.2 micrometer long segment if the magnetization direction is aligned along direction Y. In other words, an electromagnetic wave entering the optical waveguide with a 243.2 micrometer long segment with a positive gyrotropy material representing Faraday rotation of 3700 deg/cm attached to the waveguide as a cladding will cause a phase shift of 90 degrees of the electromagnetic wave at a length of 243.2 micrometers relative to the beginning of the 243.2 micrometer long segment.

A purpose of magnetically polarizing the segment is so that the segments effectively become magnets and have their own magnetization. This means that an externally applied magnetic field is not required in order to produce the magnetization and the segment is considered "magnet free." However, magnetically polarizing the 243.2 micrometer long segment during manufacturing is difficult because the magnetic polarization has a preference to align in the Z direction if the length (along direction Z) of the segment is longer than a width (along direction Y) of the segment.

Figure 3A:
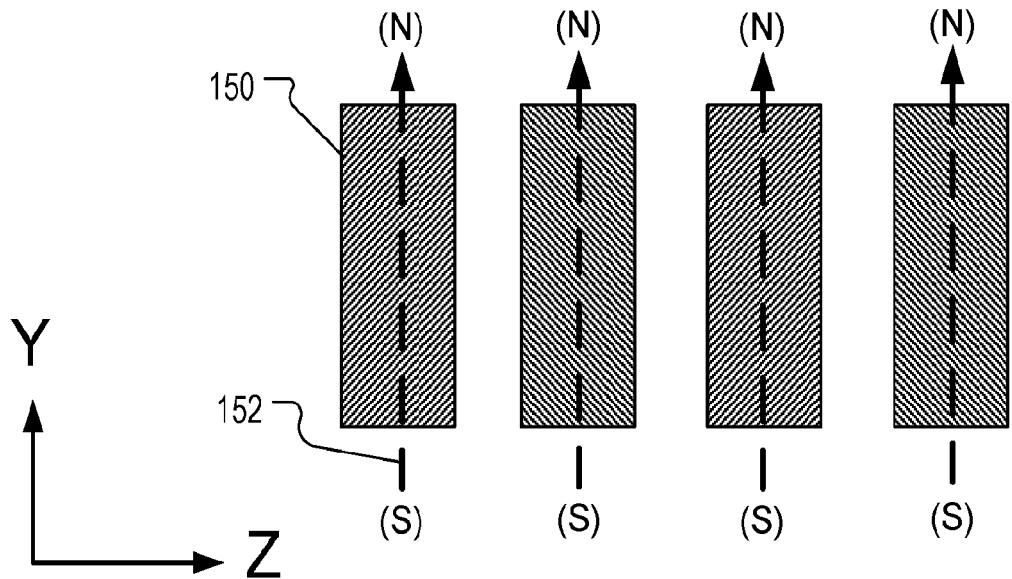
FIG. 3A is a schematic illustrating a segment of a NRPS device with a common magnetic polarization direction.

FIG. 3A illustrates an example of plurality of segments 150 with a magnetization direction 152 aligned in direction Y. FIG. 3A illustrates an approach to "break-up" the single segment into smaller segments that have a width (along direction Z) longer than a length (along direction Z). For example, the width can be between 400 and 600 nanometers (e.g., 500 nanometers) along direction Y and the length can be between 0.5 and 1.5 micrometers (e.g., 1 micrometer) along direction Z. Each segment is able to be magnetically polarized such that the magnetization direction is aligned along direction Y because the width (along direction Y) of each segment 150 is longer than the length (along direction Z) of each segment 150. When the segments 150 are magnetically polarized during manufacturing, the segments 150 effectively become magnets and have their own magnetization. However, because each segment 150 would have aligned north (N) and south (S) poles, the magnetizations of each segment would oppose the magnetization of each adjacent segment. This would not be a stable magnetic state unless an external force is applied to force the segments 150 together.

Figure 3B:
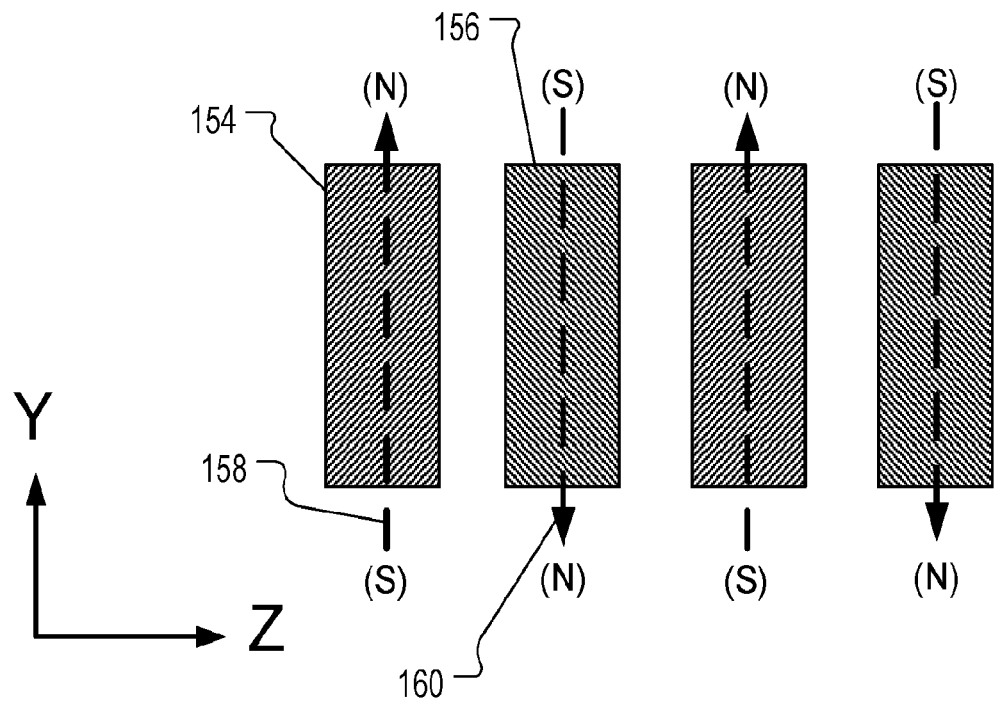
FIG. 3B is a schematic illustrating a segment of a NRPS device with an opposite magnetic polarization direction.

FIG. 3B illustrates an example of a plurality of segments 154, 156 with alternating magnetization directions 158, 160 aligned in direction Y. To avoid requiring an external force to hold the segments in place, the segments 154, 156 are "flipped" relative to each other to form an alternating pattern of magnetization directions 158, 160. This results in a magneto-statically stable state and enables the segments 154, 156 to be placed next to and in contact with each other.

However, if each of the plurality of segments 154, 156 are all made of the same gyrotropy material (positive or negative), then "flipping" every other segment would essentially reset the phase shift of the electromagnetic wave passing through the magnetization. For example, if the first segment 154 has a gyrotropy material that represents a Faraday rotation of 3700 deg/cm and has a length of 1 micrometer along direction Z, then the amount of phase shift to the electromagnetic wave is 0.37 degrees per segment. If the next segment in the series has the same gyrotropy material that represents a Faraday rotation of 3700 deg/cm but is "flipped," then the phase shift to the electromagnetic wave is −0.37 degrees per segment, effectively cancelling the phase shift.

A solution is to not only alternate magnetization directions 158, 160, but also to alternate positive and negative gyrotropy materials. For example, if the first segment 154 has a positive gyrotropy material that represents a Faraday rotation of 3700 deg/cm and has a length of 1 micrometer along direction Z, then the amount of phase shift to the electromagnetic wave is 0.37 degrees per segment. Then, if the second segment 156 has a negative gyrotropy material that represents a Faraday rotation of −3700 deg/cm and is arranged so that the magnetization direction 160 is opposite the magnetization direction 158, then the amount of phase shift to the electromagnetic wave is 0.37 degrees per segment in the same direction. As a result, the phase shift is accumulated as the electromagnetic wave propagates through each positive and negative gyrotropy segments when the magnetization directions are aligned opposite each other.

Referring back to FIGS. 1A and 1B, the segments 110A, 110B of the NRPS device 100 are arranged in an alternating pattern so that the NRPS device 100 produces an accumulated phase shift (PS) of an electromagnetic wave 116 when the electromagnetic wave 116 propagates through the optical waveguide 102. As described above, the alternating pattern means that the segments 110A, 110B include positive and negative gyrotropy materials with magnetization directions 112A, 112B aligned opposite each other. The "push-pull" aspect of the NRPS device 100 relates to alternating the plurality of segments 110 of positive and negative Faraday rotating segments on the magneto-optical cladding layer 108.

FIGS. 1A and 1B illustrate the plurality of segments 110 repeated 2 times for a total of 4 segments 110. As described above, the total length of the segments will depend on the total accumulated phase shift (PS) desired, the gyrotropy properties of the segments, and the size of the segments. In some implementations, the plurality of segments 110 is repeated more than 2 times (e.g., 3×, 4×, 5×, 10×, 50×, 100×, 200×, etc.). In some implementations, the plurality of segments 110 is repeated 8 times (e.g., as shown in FIG. 5A). In some implementations, the plurality of segments 110 is not repeated.

As described above, designing the segments to have a length (along the Z direction) longer than a width (along the Y direction) is important in order to magnetically polarize the materials in the Y direction. In some implementations, each segment 110A, 110B within the plurality of segment 110 is substantially equal in size (e.g., length along Z direction, width along Y direction, and height along X direction). In some implementations, the first segments 110*a* have a larger height (or thickness) than the second segments 110*b* (as shown in FIG. 2). In some implementations, the first segments 110*a* have a smaller height (or thickness) than the second segments 110*b*.

In some implementations, the plurality of segments 110 have a width of between 400 and 600 nanometers (e.g., 500 nanometers) along the direction transverse to the longitudinal direction 114 of the waveguide 102 (e.g., direction Y) and a length of between 0.5 and 1.5 micrometers (e.g., 1 micrometer) along the direction transverse to the longitudinal direction 114 of the optical waveguide 102 (e.g., direction Z).

In some implementations, the first segment 110A has a positive gyrotropy and the second segment 110B has negative gyrotropy. In some implementations, the negative gyrotropy between 0 degrees per centimeter and −4500 deg/cm (e.g., −4500 deg/cm, −3800 deg/cm, −3700 deg/cm, or −3200 deg/cm, among others). In some implementations, the positive gyrotropy is between 0 deg/cm and 500 deg/cm (e.g., 300 deg/cm, 400 deg/cm, 500 deg/cm, among others). In some implementations, the positive gyrotropy is between 500 deg/cm and 4500 deg/cm (e.g., 700 deg/cm, 800 deg/cm, 1000 deg/cm, 4500 deg/cm, among others).

In some implementations, the absolute value of the positive gyrotropy and the negative gyrotropy are equal. For example, the sizes of the segments 110 can be sized similarly if the magnitudes of negative gyrotropy and positive gyrotropy are equal. As a result, in some implementations, a size of the first segment 110A is substantially the same as a size of the second segment 110B. In some implementations, the absolute value of the positive gyrotropy and the negative gyrotropy are equal and the positive gyrotropy is between 0 deg/cm and 4500 deg/cm (e.g., 3200 deg/cm).

As described above, as the electromagnetic wave 116 propagates through the optical waveguide 102, the electromagnetic wave 116 generates a partial phase shift (PS) when the effect of the magnetization is observed by the electromagnetic wave 116 via the Faraday Effect. As the electromagnetic wave 116 propagates past the first segment 110A with positive gyrotropy, the wave 116 experiences a partial phase shift (PS) in a first direction (e.g., the Z direction). When the electromagnetic wave 116 propagates past the second segment 110B with negative gyrotropy, the partial phase shift (PS) is still in the first direction (e.g., the Z direction). Hence, there is a net accumulation of phase shift (Faraday rotation) every positive and negative segmented cycle of segments 110.

In some implementations, the negative Faraday rotating garnet 110B is one or more of Ce:YIG, Bi:TIG, Bi:TbIG, and Ce:TbIG. In some implementations, the positive and negative Faraday rotating garnets 110A, 110B, respectively, are seedlayer free. A seedlayer-free design means that the garnets do not need to be deposited in two steps by first depositing a seed layer of undoped garnet on the optical waveguide 102, followed by depositing a doped layer of garnet on the seed layer. Instead, the garnet is deposited directly on the optical waveguide 102 without the seedlayer.

As described above, the plurality of segments 110 are part of a magneto-optical cladding layer 108. In some implementations, a length of the magneto-optical cladding layer 108 as measured along the Z direction is less than 500 micrometers (e.g., 300 micrometers, 400 micrometers). This length depends on the amount of the phase shift (PS) required by the NRPS device 100 and the size and gyrotropy of each segment.

In some implementations, the NRPS device 100 includes a laser source 118 that generates the electromagnetic wave 116. In some examples, the electromagnetic wave 116 has a wavelength in near infrared spectrum (e.g., about 1100 to 1650 nm) such that it propagates through the Si waveguide. In these examples, wavelengths greater than 1100 nm can be used. In some examples, wavelengths between 1330 nm and 1550 nm are used. In some examples, the electromagnetic wave 116 has a wavelength of 1400 nm.

In some examples, the electromagnetic wave 116 has a wavelength in the visible spectrum (e.g., about 380 to 740 nm) such that it propagates through a Silicon nitride wave guides with garnet claddings. In these examples, wavelengths above 500 nm can be used.

In some implementations, the NRPS device 100 includes optical components 120 that use the electromagnetic wave 116. In some examples, the optical components 120 are part of a photonic integrated circuit (PIC) (e.g., an optical transistor, and optical multiplexer, etc.).

In some examples, the optical components 120 are part of an interferometer, e.g., interferometer 400 described with reference to FIGS. 5A and 5B. In some implementations, the NRPS device 100 is monolithically integrated (e.g., built together to form a single structure) onto the substrate 104. In other words, monolithically integrated means that the NRPS device 100 is manufactured from the "bottom-up" starting from the substrate 104 layer by layer within a vacuum chamber (sometimes with lithography steps). A monolithically integrated NRPS device 100 is different from a "pick and place" NRPS device that would require each component to be manufactured separately and then bonded or placed onto a substrate.

FIGS. 4A and 4B show plots illustrating a micro-magnetic simulation of magnetization for an exemplary NRPS device (e.g., the NRPS device 100). The simulation was performed using a finite difference method. The length and width of the simulation domain shown in FIG. 4A corresponds to the length and width of the magneto-optic cladding layer 108 as shown in FIGS. 1A-1B and FIG. 2.

Materials used in the simulation were Ce:TbIG and YIG for the negative and positive segments, respectively. Sizes of each segment were set to 1 micrometer wide (along Z direction) and 500 nm long (along Y direction). The saturation magnetization of Ce:TbIG and YIG were approximated to be 20 emu/cc and 143 emu/cc, respectively. The garnets were considered to be polycrystalline with no preferred magneto crystalline anisotropy.

The results of the simulation indicate that the alternating arrangement of positive and negative gyrotropic segments 110A, 110B, have magnetization directions 112A, 112B, respectively, and that the magnetization is stable in this arrangement. The simulation was run for 50 ns and shows that the segments tend to stay magnetized due to strong magnetostatic coupling. As shown, the magnetization 112A is along the Z direction and the results are aligned with the +Y and −Y directions. In other words, the magnetization directions 112A, 112B are anti-parallel to each other. In other words, the magnet-free operation of these NRPS device 100 relies on this stable magnetostatic coupling between the segments 110.

The magnetic properties of negative and positive gyrotropy segments preferably have very large (>1 kOe) and small (<200 Oe) coercivities, respectively. Small coercivity enables the formation of magnetostatically stable structures and large coercivity prevents unintentional demagnetization. Preferably the alternate segments have alternating small and large coercivities to enable both a stable structure and limit unintentional demagnetization.

Furthermore, transverse stray fields from the NRPS device 100 rapidly decay from 50 Oe at the edge to a negligible value. The NRPS device 100 uses magneto-optic materials with low room temperature magnetizations which limit the stray field to less than 50 Oe at the edges and sides of the garnet cladding 108 as predicted from the simulations. The simulation model was tested at 300 K and the design showed consistent magnetic stability with fluctuations less than 0.1% over a simulation period of 50 ns.

In some implementations, the NRPS device 100 can be used in an optical isolator, e.g., in a Mach-Zehnder interferometer. For example, in some implementations, Mach-Zehnder interferometers include magnetostatically stable push-pull (positive and negative gyrotropy) NRPS devices 100 in each branch of the interferometer. Such interferometer designs can be used in photonic quantum computing and massively parallel computing systems and can be extremely small.

In some implementations, an advantage of using a NRPS device, such as device 100 in an optical isolator is that the optical isolator can be operated with requiring the use of an external magnetic field. In some implementations, optical isolators using the NRPS devices described herein can isolate TE and TM polarizations. For example, an isolator arranged in an interferometer design can isolate TM polarization. Adding polarization converters for TE to TM polarizations enable TE mode isolation as well. TM polarizations can be isolated using a cladding of garnet on the waveguide. The sidewalls of the waveguides can isolate TE polarizations if they are coated.

Mach-Zehnder interferometers induce a non-reciprocal phase shift in the guided mode of one branch of an interferometer, such that there is constructive interference in the forward direction and destructive interference in the reverse direction. The total phase shift for the forward and reverse directions can be expressed as:

$$\Delta\varphi_{forward} = \beta \times \Delta L | (\beta_{left} \times L - \beta_{right} \times L) \quad \text{Eq. 1}$$

$$\Delta\varphi_{reverse} = \beta \times \Delta L - (\beta_{left} \times L - \beta_{right} \times L) \quad \text{Eq. 2}$$

where $\Delta\varphi$ is the phase difference (forward or backward) between the branches, $\beta$ is the propagation constant in the absence of a magnetization, L is the length of the waveguide with the magneto-optic cladding, $\Delta L$ is geometric length difference between the two waveguides, $\beta_{left}$ and $\beta_{right}$ are the propagation constants due to the magneto-optic effect in the two branches. The propagation constants are a measure of how the change in amplitude and phase of an electromagnetic wave propagating in a medium with certain optical and magnetic properties. In general, the propagation constants depend on the material and geometry of the waveguide and the polarization of the electromagnetic wave.

The segments have non-zero off diagonal elements in their permittivity tensor matrix:

$$\varepsilon_{forward} = \begin{bmatrix} \varepsilon_{xx} & i\varepsilon_{xy} & 0 \\ -i\varepsilon_{yx} & \varepsilon_{yy} & 0 \\ 0 & 0 & \varepsilon_{zz} \end{bmatrix}, \varepsilon_{reverse} = \begin{bmatrix} \varepsilon_{xx} & -i\varepsilon_{xy} & 0 \\ i\varepsilon_{yx} & \varepsilon_{yy} & 0 \\ 0 & 0 & \varepsilon_{zz} \end{bmatrix} \quad \text{Eq. 3}$$

These non-zero off diagonal elements mean that the segments are anisotropic with respect to forward and reverse propagation. The non-reciprocity adds an additional phase of $2\Delta\beta L$. For substantially effective isolation, the accumulated phase difference can be set equal to $\pi$ (that is $\Delta\varphi_{reverse} = 2\pi n + \pi$) between the forward and reverse propagations.

In some implementations, setting the accumulated phase difference to R is achieved by designing the geometric length difference between the two branches of the interferometer such that the reciprocal phase shift is $\pi/2$ and the non-reciprocal phase difference is $-\pi/2$ and $\pi/2$ in the forward and reverse directions, respectively. In order to determine the length of each branch of the interferometer, optical simulations are used to determine the propagation constant for the TM polarization. The lengths of each interferometer branch with garnet cladding are calculated from $L = \pi/(2\Delta\beta^{TM})$, where $\beta^{TM}$ is the propagation constant for the TM polarization. The number of segments in each branch depend on L. The additional $\pi$ phase difference in the reverse direction results in destructive interference, isolating the reflected light.

FIGS. 5A and 5B show an example of an optical isolator 400 that includes a NRPS device (e.g., the NRPS device 100). In particular, the optical isolator 400 includes an optical waveguide 402 (e.g., a silicon waveguide) including optical paths 404A, 404B arranged as an interferometer on a substrate 406 (e.g., a SiO$_2$ substrate). Electromagnetic waves entering from a first side 408A propagate through the optical isolator 400 and arrive at the second side 408B of the optical isolator 400.

The optical isolator 400 includes a magneto-optical cladding layer 410 on each path (e.g., 404A and 404B) of the optical paths 404A, 404B of the optical waveguide 402. The magneto-optical cladding layer 410 includes multiple segments 412A, 412B. The magneto-optical cladding layer 410 is arranged having alternating magnetization directions 414A, 414B, which are aligned transverse (e.g., along the Y direction in FIG. 5A) to a longitudinal direction 416 (e.g., along the Z direction in FIG. 5A) of the optical waveguide 402. The properties of the magneto-optical cladding layer 410 are substantially similar to the magneto-optical cladding layer 108 of the NRPS device 100 and will not be repeated here.

Light propagating in the silicon waveguide 402 will first experience a phase shift that is proportional to the positive gyrotropy of the first segment 412A and then accumulate the phase shift because of the negative gyrotropy and opposite magnetization direction (e.g., 414A vs. 414B) of the second segment 412B.

In some implementations, each path (e.g., 404A and 404B) of the plurality of optical paths 404 include positive and negative gyrotropy segments that have a Faraday Rotation of greater than |3500|deg/cm. In some cases, gyrotropic values of the positive and negative gyrotropy segments are equal and opposite each other (e.g., 3800 deg/cm and −3800 deg/cm, respectively). In some cases, garnets possessing high gyrotropy (+/−3800 deg/cm) are used for both the positive and negative gyrotropy segments and the overall length of the optical isolator 400 is reduced so that the overall length, measured from the first side 408A to the second side 408B, is less than 400 micrometers (e.g., 300 micrometers). The length will be governed by a difference in propagation constant and the total phase shift between forward and reverse propagations of the optical isolator 400.

An optical isolator, such as optical isolator 400, can have multiple advantages. For instance, in some implementations, the optical isolator 400 can have a high isolation ratio in the forwards and backwards direction (e.g., >25 dB). For example, a high isolation ratio can be achieved by having the optical isolator 400 couple electromagnetic waves from both branches 404A, 404B together such that the electromagnetic waves interfere constructively forward (e.g., transmit), but the electromagnetic waves interfere destructively (e.g., cancel) in the backward direction. In a ring resonator, isolation occurs by a coupling of backward traveling light into the ring, whereas forward traveling light can't form a standing wave in the ring, so it doesn't couple to the ring, but rather transmits straight through the isolator.

In some cases, the isolation ratio is measured by flipping the input and output. For example, first light is sent in one direction and the intensity of the electromagnetic wave is measured at the output (e.g., in the forward direction). Then the light is sent via the output port and measured at the input (e.g., in the reverse direction). The ratio between the two intensities (i.e., forward divided by reverse) is the isolation ratio.

In some implementations, the optical isolator 400 has a low insertion loss in the forward direction (e.g., <1 dB). For example, low insertion loss is achieved by a very low loss material and by having smooth features (e.g. waveguide surfaces are typically smooth). The intensity of the electromagnetic wave can be measured at the output of the device and compared with the intensity of the light before coupling into the device. The comparison between the two gives insertion loss. In some cases, the optical isolator can be formed to have a small footprint (e.g., <1 mm in all X, Y, and Z directions as shown in FIG. 5A) because of the combination of the high gyrotropy materials (e.g., |3500|deg/cm) and the alternating arrangement of the segments so that they are magneto-statically stable. As noted above with reference to the NRPS device 100, the optical isolator 400 also does not require the use of an external magnetic field to generate a phase shift. In some implementations, the optical isolator is compatible with both TE and TM polarized waves.

FIGS. 6A-6I are schematics that depict a process for manufacturing a NRPS device (e.g., the NRPS device 100) and a non-reciprocal optical isolator (e.g., optical isolator 400).

Figure 6A:
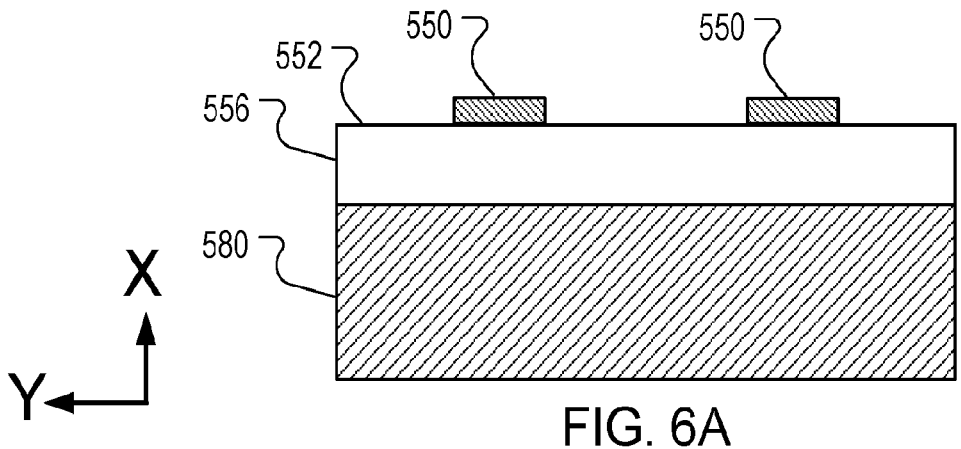
FIGS. 6A-6I are schematics illustrating a manufacturing sequence for manufacturing a NRPS device.
Figure 6B:
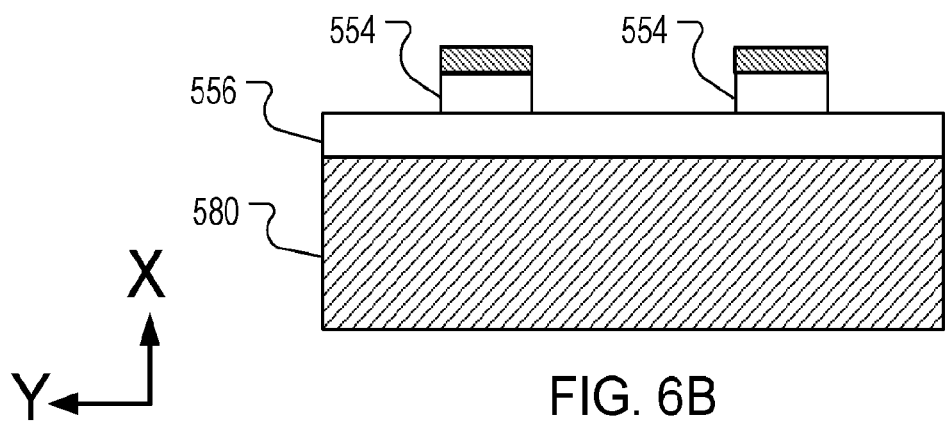
Figure 6C:
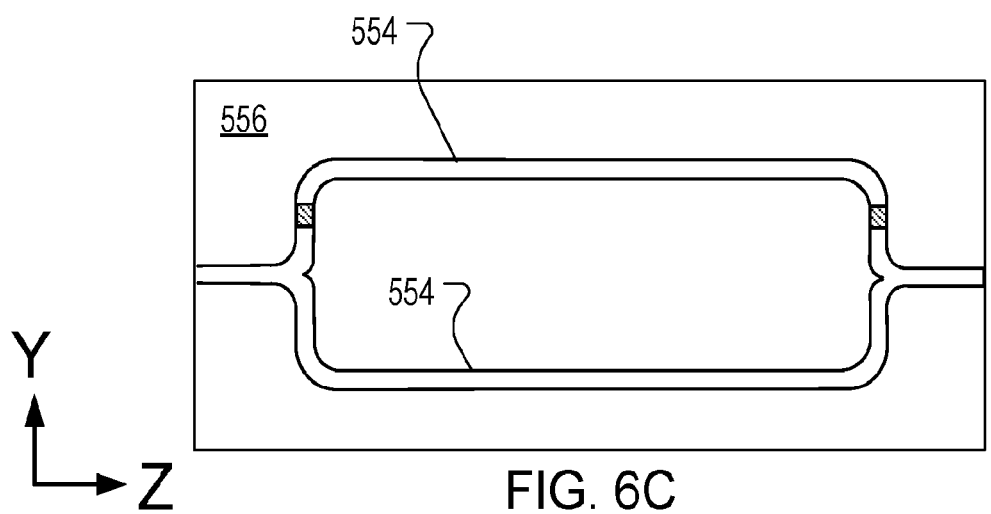

FIGS. 6A-6C depict formation of an optical waveguide 554 in the form of a Mach-Zehnder interferometer. FIG. 6A is a transverse cross-section view of a substrate 556 (e.g., a $SiO_2$ substrate) showing photo resist 550 patterned on a top surface 552 using e-beam lithography. An insulator 580 is below the substrate 556 so that electromagnetic waves reflect within the substrate 556 and do not enter the insulator 580.

FIG. 6B is a transverse cross-section view showing two Si waveguides 554 after being dry etched on the substrate 556. FIG. 6C is a top view showing the Mach-Zehnder interferometer pattern with two optical paths 554 on the substrate 556. In some implementations, the optical waveguide 554 is provided on the substrate 556 in the state shown in FIG. 6C. In some implementations, the substrate 556 is a 220 nm SOI and the patterning may be performed using e-beam lithography and dry etched in a chemical ambient.

Figure 6D:
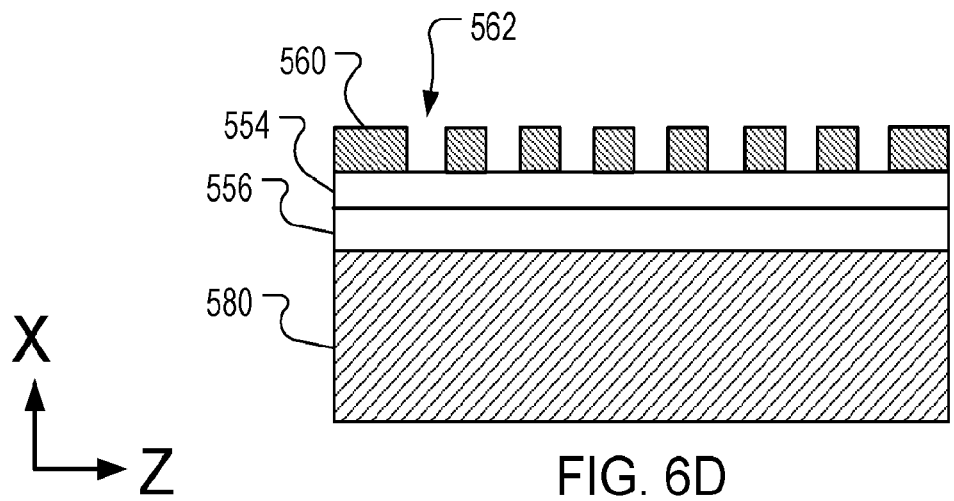
Figure 6E:
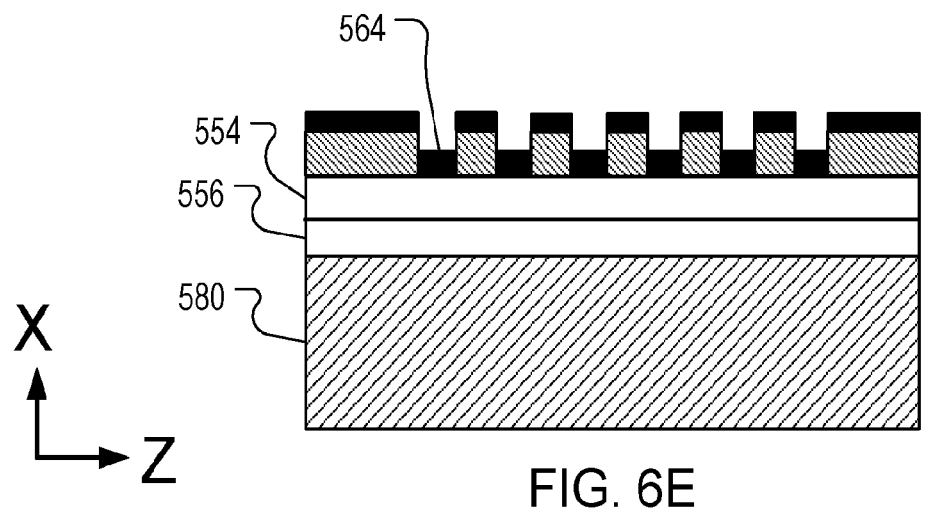
Figure 6F:
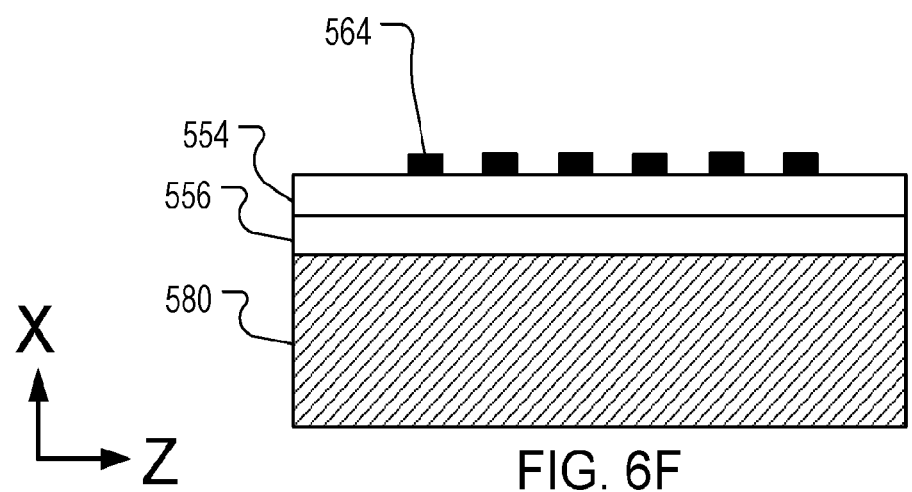

FIGS. 6D-6F show a magneto-optical cladding layer being formed on the optical waveguide 554. The magneto-optical cladding layer includes a plurality of segments arranged having alternating magnetization directions aligned transverse to a longitudinal direction of the optical waveguide. FIG. 6D is longitudinal cross-section view showing photo resist 560 being patterned using e-beam lithography. Photoresist is patterned to create windows 562 for the deposition of negative gyrotropy garnets onto segments of each waveguide.

FIG. 6E is a longitudinal cross-section view showing negative gyrotropy garnet segments 564 being sputter deposited onto the optical waveguide 554. As previously described, each of these segments 564 have an aspect ratio where the width of the segment 564 (along direction Y) is longer than the length (along direction Z). As described above, this property enables the segments 564 to be magnetically polarized in the direction Y direction.

Figure 6G:
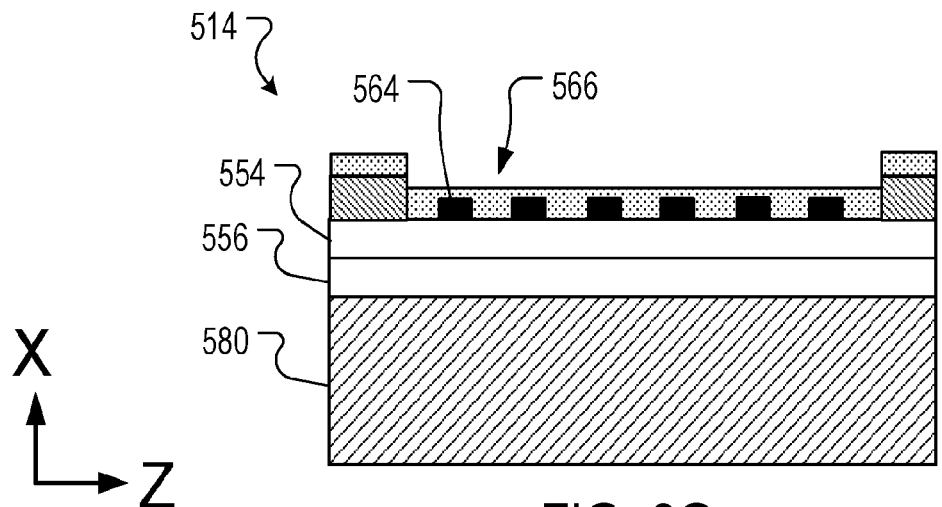

FIG. 6F is a longitudinal cross-section view showing lift-off of the photoresist leaving the negative gyrotropy garnet segments 564 in place. After lift-off, a second layer of photoresist is patterned to open windows for the deposition of the positive gyrotropy materials. FIG. 6G is a longitudinal cross-section view showing photo resist and positive gyrotropy garnets 566 being sputter deposited onto the optical waveguide 554.

Figure 6H:
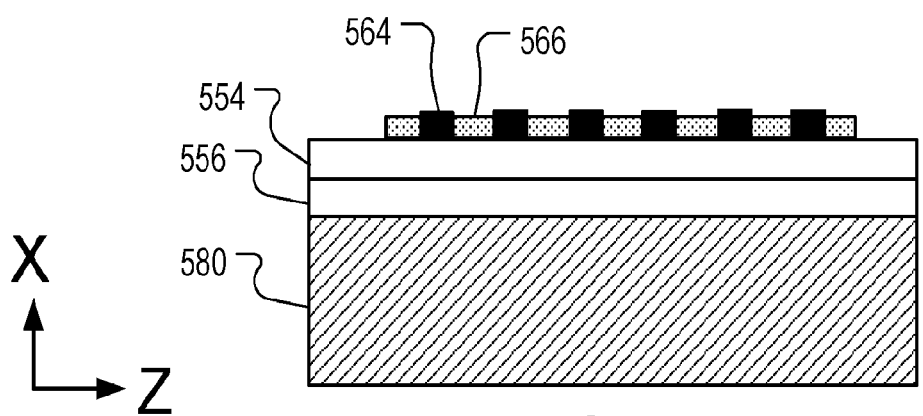
Figure 6I:
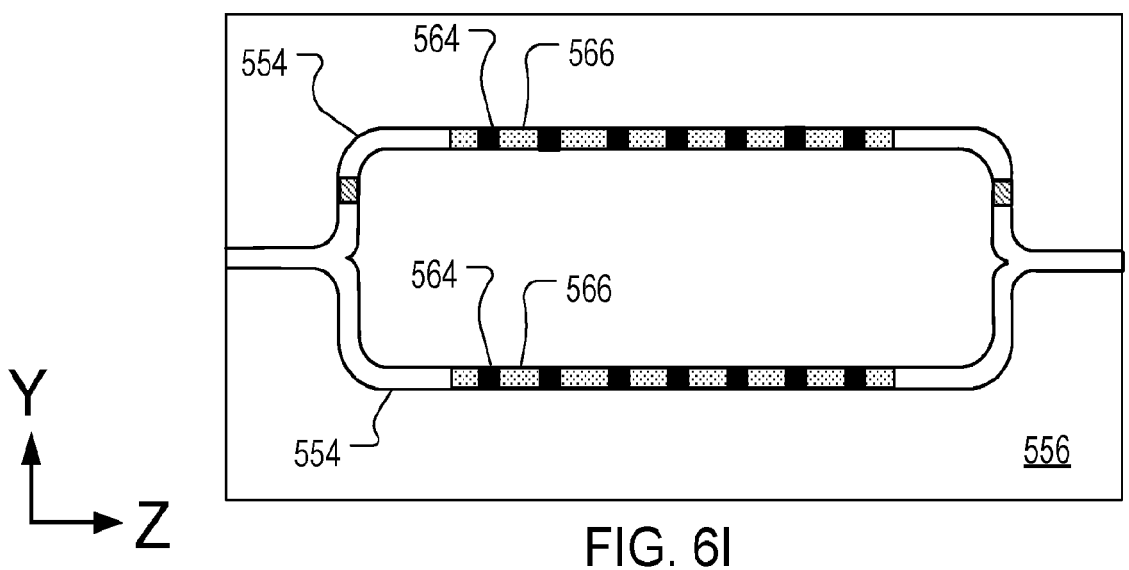

FIG. 6H is a longitudinal cross-section view showing lift off, annealing, and magnetization to generate a large positive magnetization. The device is then subjected to an optimized RTA process to crystallize both the positive and negative gyrotropy garnet segments 566, 564, respectively. FIG. 6I is a top view of the Mach-Zehnder interferometer pattern with the garnet cladding in the final state.

In some implementations, an intermediary RTA step can also be used for crystallizing the negative garnet first, but this increases the overall thermal budget. In some implementations, the high temperature process is performed in a single step such that it is foundry-friendly.

In some implementations, the first material and the second material include one or more of Ce:YIG, Bi:TIG, Bi:TbIG, and Ce:TbIG garnets. In some implementations, the first material has either a positive or negative gyrotropy and the second material has the other of the positive or negative gyrotropy.

Figure 7:
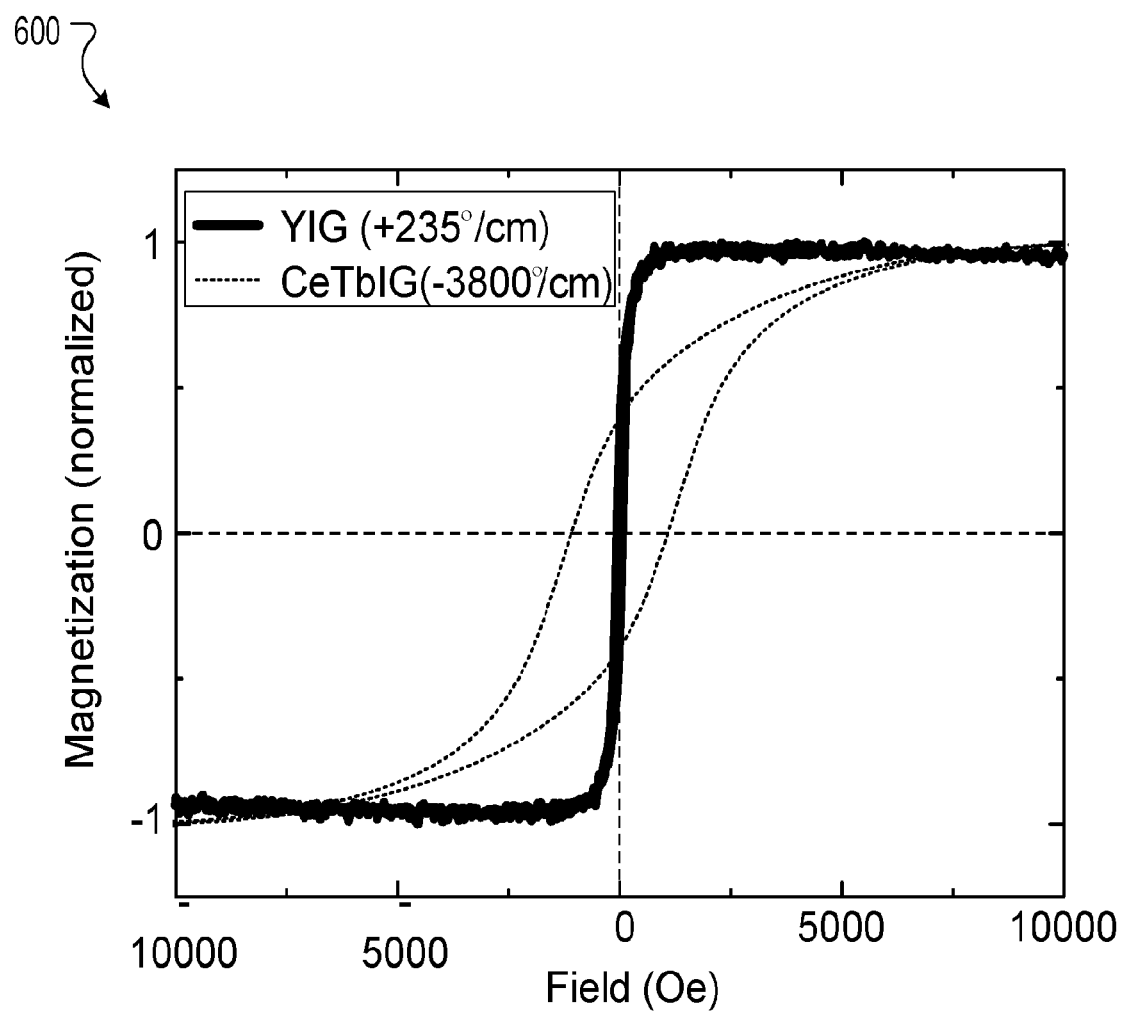
FIG. 7 is a plot illustrating an example of magnetization as a function of magnetization for garnet materials used in an NRPS device.

FIG. 7 is a hysteresis plot of garnet materials used in the non-reciprocal phase shift device 100. After annealing of the full structure to obtain the garnet phase in the claddings, a large transverse magnetization (5 kOe) is applied to set the magnetization in the garnet. As shown in FIG. 7, even when there is no external field, the garnets will have remnant magnetizations close to their saturation magnetizations, so zero-field magnetization results in a large magnetic gyrotropy. This remnance is reinforced by the dipole fields that the garnet sections will exert on each other for the very stable state shown in FIG. 7.

High-gyrotropy garnets can, in some examples, reduce the footprint of isolators. Bulk free space or fiber isolators use thick (~500 um) crystals of terbium gallium garnet (TGG) or bismuth doped yttrium iron garnet (BiYIG), but these usually are not compatible with integrated isolators due to material incompatibility or low magnetic gyrotropy. Epitaxial CeYIG thin films grown on lattice matched GGG have a high gyrotropy of −4500 deg/cm at 1550 nm light, but they require wafer bonding to silicon (heterogeneous integration).

A fully integrated monolithic isolator with this garnet typically required a thin seedlayer of YIG. However, since the seedlayer and doped layer each require their own high temperature annealing and multiple lithographic alignment steps, this process increases the thermal budget and alignment errors in manufacturing.

In light of the integration and processing challenges with seedlayer garnets, a novel seedlayer-free cerium-doped terbium iron garnet (Ce:TbIG) has been developed that crystallizes on silicon in the desired phase. This garnet is described in more detail in PCT Application PCT/US2020/029333 filed Apr. 22, 2020 and incorporated herein by reference in its entirety. Through careful control and optimization of dopant concentration, annealing temperature and sputtering process parameters, high quality CeTbIG with gyrotropy as large as −3800 deg/cm was obtained.

A number of embodiments have been described. Nevertheless, it will be understood that various modifications may be made without departing from the spirit and scope of the invention. Accordingly, other embodiments are within the scope of the claims.

What is claimed is:

1. A non-reciprocal phase shift device comprising:
   an optical waveguide on a substrate; and
   a magneto-optical cladding layer on the optical waveguide, wherein the magneto-optical cladding layer comprises a plurality of segments arranged having (i) alternating magnetization directions aligned transverse to a longitudinal direction of the optical waveguide and (ii) alternating positive gyrotropy and negative gyrotropy.

2. The non-reciprocal phase shift device of claim 1, wherein the plurality of segments comprise first segments having the positive gyrotropy and a first magnetization direction, and second segments having the negative gyrotropy and a second magnetization direction, and
   wherein the first segments and the second segments cause a phase shift in the same direction for an electromagnetic wave within the optical waveguide.

3. The non-reciprocal phase shift device of claim 1, wherein the plurality of segments alternate in the longitudinal direction of the optical waveguide.

4. The non-reciprocal phase shift device of claim 1, wherein the plurality of segments comprise first segments having the positive gyrotropy and a first magnetization direction, and second segments having the negative gyrotropy and a second magnetization direction, and
   wherein the first segments and the second segments are composed of different materials.

5. The non-reciprocal phase shift device of claim 1, wherein the negative gyrotropy has a magnitude less than 3200 degrees per centimeter.

6. The non-reciprocal phase shift device of claim 5, wherein the positive gyrotropy is less than 500 degrees per centimeter.

7. The non-reciprocal phase shift device of claim 1, wherein the positive gyrotropy and the negative gyrotropy have equal magnitudes.

8. The non-reciprocal phase shift device of claim 7, wherein the positive gyrotropy is greater than or equal to 3500 degrees per centimeter.

9. The non-reciprocal phase shift device of claim 1, wherein the plurality of segments are configured to provide a phase shift to an electromagnetic wave within the optical waveguide.

10. The non-reciprocal phase shift device of claim 9, wherein the phase shift is accumulated as the electromagnetic wave propagates through the plurality of segments.

11. The non-reciprocal phase shift device of claim 1, wherein the alternating magnetization directions are opposite relative to each other.

12. The non-reciprocal phase shift device of claim 1, wherein an external magnetic field is not required to sustain magnetization of the plurality of segments.

13. The non-reciprocal phase shift device of claim 1, wherein the plurality of segments are magnetostatically stable without an externally applied magnetic field.

14. The non-reciprocal phase shift device of claim 1, wherein the non-reciprocal phase shift device is monolithically integrated.

15. The non-reciprocal phase shift device of claim 1, wherein the plurality of segments comprise one or more of: Ce:YIG, Bi:TIG, Bi:TbIG, Ce:TbIG, YIG, and TbIG garnets.

16. The non-reciprocal phase shift device of claim 1, wherein the plurality of segments comprise seedlayer-free garnets.

17. The non-reciprocal phase shift device of claim 1, wherein the plurality of segments are longer along a direction transverse to the longitudinal direction of the optical waveguide than along the longitudinal direction.

18. The non-reciprocal phase shift device of claim 17, wherein the plurality of segments have a width of 500 nanometers along the longitudinal direction of the optical waveguide and a length of 1 micrometer along the direction transverse to the longitudinal direction of the optical waveguide.

19. The non-reciprocal phase shift device of claim 1, wherein a length of the magneto-optical cladding layer measured along the longitudinal direction of the optical waveguide is less than 500 micrometers.

20. The non-reciprocal phase shift device of claim 1, further comprising the substrate.

21. An optical isolator comprising:
   an optical waveguide comprising a plurality of optical paths arranged as an interferometer on a substrate; and
   a magneto-optical cladding layer on each path of the plurality of optical paths of the optical waveguide, wherein the magneto-optical cladding layer comprises a plurality of segments having (i) alternating magnetization directions aligned transverse to a longitudinal direction of the optical waveguide and (ii) alternative positive gyrotropy and negative gyrotropy.

22. A method of manufacturing a non-reciprocal phase shift device, the method comprising:
   providing an optical waveguide on a substrate; and
   forming a magneto-optical cladding layer on the optical waveguide, wherein the magneto-optical cladding layer comprises a plurality of segments arranged having (i)

alternating magnetization directions aligned transverse to a longitudinal direction of the optical waveguide and (ii) alternative positive gyrotropy and negative gyrotropy.

23. The method of claim 22, wherein forming the magneto-optical cladding layer comprises:
patterning a first material on the optical waveguide, the first material forming first segments of the plurality of segments; and
patterning a second material, different from the first material, on the optical waveguide, the second material forming second segments of the plurality of segments,
wherein the first segments have a first magnetization direction, and
wherein the second segments have a second magnetization direction.

24. The method of claim 23, wherein the first material has the positive gyrotropy and the second material has the negative gyrotropy.

25. The method of claim 23, wherein the first material and the second material comprise one or more of: Ce:YIG, Bi:TIG, Bi:TbIG, Ce:TbIG, YIB, and TbIG garnets.

26. A non-reciprocal phase shift device comprising:
an optical waveguide on a substrate; and
a cladding comprising alternating segments of positive and negative Faraday rotating garnets on the optical waveguide, the positive and negative Faraday rotating garnets configured to cause a phase shift in the same direction for an electromagnetic wave within the optical waveguide.

27. The non-reciprocal phase shift device of claim 26, further comprising the substrate.

28. The non-reciprocal phase shift device of claim 26, wherein a net accumulation of Faraday rotation is achieved every positive and negative segmented cycle.

29. The non-reciprocal phase shift device of claim 26, wherein the alternating segments of the cladding are segmented such that dipole interactions stabilize magnetization while adding a phase shift.

30. The non-reciprocal phase shift device of claim 26, wherein an external magnetic field is not required to sustain magnetization of the alternating segments.

31. The non-reciprocal phase shift device of claim 26, wherein the negative Faraday rotating garnets comprise one or more of: Ce:YIG, Bi:TIG, Bi:TbIG, and Ce:TbIG.

32. The non-reciprocal phase shift device of claim 26, wherein the positive and negative Faraday rotating garnets are seedlayer free.

33. The non-reciprocal phase shift device of claim 26, wherein the positive Faraday rotating garnets have a Faraday rotation of less than 500 degrees per centimeter.

* * * * *